(12) United States Patent
Choi et al.

(10) Patent No.: US 11,164,221 B2
(45) Date of Patent: *Nov. 2, 2021

(54) NATIVE ONLINE AD CREATION

(71) Applicant: Nativo, Inc., El Segundo, CA (US)

(72) Inventors: Justin Yoo Choi, Newport Coast, CA (US); Brett Joseph Westphal, San Gabriel, CA (US)

(73) Assignee: Nativo, Inc., El Segundo, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/511,895

(22) Filed: Jul. 15, 2019

(65) Prior Publication Data

US 2019/0392488 A1 Dec. 26, 2019

Related U.S. Application Data

(63) Continuation of application No. 14/133,442, filed on Dec. 18, 2013, now Pat. No. 10,410,257.

(60) Provisional application No. 61/738,881, filed on Dec. 18, 2012.

(51) Int. Cl.
*G06Q 30/02* (2012.01)

(52) U.S. Cl.
CPC .................. *G06Q 30/0276* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 8,165,915 B1* | 4/2012 | Lucash | ................... | G06Q 40/00 705/14.72 |
| 8,543,715 B1* | 9/2013 | Rabbat | ................... | G06F 16/972 709/229 |
| 8,949,370 B1* | 2/2015 | Wu | ........................ | H04W 4/60 709/217 |
| 9,069,768 B1* | 6/2015 | Sampson | ........... | G06K 9/00463 |
| 9,396,167 B2* | 7/2016 | Doll | ...................... | G06F 40/143 |
| 9,509,783 B1* | 11/2016 | Hayden | ................... | H04L 67/34 |
| 2002/0002568 A1* | 1/2002 | Judson | ................... | G06F 16/957 715/201 |
| 2002/0152245 A1* | 10/2002 | McCaskey | ............ | G06F 16/958 715/234 |
| 2004/0064788 A1* | 4/2004 | Gownder | .............. | G06F 40/154 715/205 |
| 2005/0028088 A1* | 2/2005 | Nagayama | ............ | G06F 40/186 715/234 |
| 2005/0177784 A1* | 8/2005 | Andrews | ............... | G06F 40/154 715/234 |

(Continued)

OTHER PUBLICATIONS

Native Ads Paired With On-Site Branded Content Bring Meaningful Brand Lift (Year: 2017).*

(Continued)

*Primary Examiner* — Gautam Ubale
(74) *Attorney, Agent, or Firm* — Van Pelt, Yi & James LLP

(57) ABSTRACT

Native online sponsored content creation is disclosed. A selection of a set of native hierarchical content elements may be received. Each of at least a subset of the native hierarchical content elements in the selected set may be mapped to one or more corresponding sponsored content elements. A template may be generated based at least in part on the mapping.

21 Claims, 10 Drawing Sheets

(56) References Cited

U.S. PATENT DOCUMENTS

| | | | | |
|---|---|---|---|---|
| 2007/0050253 | A1* | 3/2007 | Biggs | G06Q 30/02 705/14.67 |
| 2007/0192181 | A1* | 8/2007 | Asdourian | G06Q 30/02 705/14.73 |
| 2007/0206221 | A1* | 9/2007 | Wyler | G06F 16/9577 358/1.15 |
| 2007/0208703 | A1* | 9/2007 | Shi | G06F 16/951 |
| 2007/0226613 | A1* | 9/2007 | Tandriono | G06F 9/451 715/234 |
| 2008/0071829 | A1* | 3/2008 | Monsarrat | G06F 40/169 |
| 2008/0071929 | A1* | 3/2008 | Motte | H04L 67/02 709/246 |
| 2008/0082905 | A1* | 4/2008 | Martinez | G06F 16/954 715/205 |
| 2008/0140476 | A1* | 6/2008 | Anand | G06Q 30/0267 705/14.43 |
| 2008/0215426 | A1* | 9/2008 | Guldimann | G06Q 30/02 705/14.61 |
| 2008/0262913 | A1* | 10/2008 | Reitz | G06Q 30/02 705/14.36 |
| 2009/0063500 | A1* | 3/2009 | Zhai | G06F 16/986 |
| 2009/0187477 | A1* | 7/2009 | Bardin | G06Q 30/0273 705/14.69 |
| 2009/0234734 | A1* | 9/2009 | Gollapudi | G06Q 30/08 705/14.54 |
| 2009/0254803 | A1* | 10/2009 | Bayne | G06F 40/174 715/222 |
| 2009/0282349 | A1* | 11/2009 | Olsen | G06F 9/451 715/760 |
| 2009/0327934 | A1* | 12/2009 | Serpico | G06F 40/186 715/764 |
| 2010/0083163 | A1* | 4/2010 | Maghoul | G06F 1/1626 715/781 |
| 2010/0169311 | A1* | 7/2010 | Tengu | G06F 16/951 707/736 |
| 2010/0199197 | A1* | 8/2010 | Faletski | G06F 16/9577 715/760 |
| 2010/0235806 | A1* | 9/2010 | Mohan | G06F 40/186 717/100 |
| 2010/0318426 | A1* | 12/2010 | Grant | G06Q 30/0241 705/14.66 |
| 2011/0072001 | A1* | 3/2011 | Basu | G06F 16/36 707/709 |
| 2011/0078557 | A1* | 3/2011 | Seolas | H04L 43/0876 715/234 |
| 2011/0099071 | A1* | 4/2011 | Johnson | G06Q 30/02 705/14.64 |
| 2011/0099525 | A1* | 4/2011 | Krysiuk | G06F 16/9537 715/849 |
| 2011/0106615 | A1* | 5/2011 | Churchill | G06Q 30/0251 705/14.49 |
| 2011/0173071 | A1* | 7/2011 | Meyer | G06Q 30/02 705/14.54 |
| 2011/0179357 | A1* | 7/2011 | Lin | H04L 65/4084 715/733 |
| 2011/0213655 | A1* | 9/2011 | Henkin | G06Q 30/0251 705/14.49 |
| 2011/0218861 | A1* | 9/2011 | Pelamourgues | G06Q 30/0267 705/14.64 |
| 2011/0231776 | A1* | 9/2011 | Wald | G06F 16/954 715/738 |
| 2011/0283186 | A1* | 11/2011 | Caro | G06F 40/10 715/248 |
| 2011/0321003 | A1* | 12/2011 | Doig | G06F 16/904 717/107 |
| 2012/0010995 | A1* | 1/2012 | Skirpa | G06F 16/95 705/14.49 |
| 2012/0016655 | A1* | 1/2012 | Travieso | G06F 16/958 704/2 |
| 2012/0137211 | A1* | 5/2012 | Lewontin | G06F 16/84 715/236 |
| 2012/0137233 | A1* | 5/2012 | Lewontin | G06F 16/9577 715/760 |
| 2012/0158513 | A1* | 6/2012 | Schoen | G06Q 30/0276 705/14.66 |
| 2012/0203831 | A1* | 8/2012 | Schoen | G06Q 30/0269 709/204 |
| 2012/0233235 | A1* | 9/2012 | Allaire | B01J 6/008 709/201 |
| 2012/0239506 | A1* | 9/2012 | Saunders | G06Q 30/02 705/14.67 |
| 2012/0246017 | A1* | 9/2012 | Kleber | G06Q 30/02 705/14.73 |
| 2012/0254730 | A1* | 10/2012 | Sunderland | G06F 40/186 715/235 |
| 2012/0272141 | A1* | 10/2012 | Hanechak | G06F 16/986 715/234 |
| 2012/0323940 | A1* | 12/2012 | Davis | G06F 16/958 707/756 |
| 2013/0110647 | A1* | 5/2013 | Gindi | G06Q 30/0241 705/14.73 |
| 2013/0124684 | A1* | 5/2013 | Zheng | G06F 40/221 709/217 |
| 2013/0124969 | A1* | 5/2013 | Schochler | G06F 40/226 715/234 |
| 2013/0132191 | A1* | 5/2013 | Galai | G06Q 30/0251 705/14.49 |
| 2013/0151943 | A1* | 6/2013 | Zhu | G06F 16/9577 715/234 |
| 2013/0151974 | A1* | 6/2013 | Cho | G06F 8/38 715/733 |
| 2013/0185750 | A1* | 7/2013 | Ayoub | H04N 21/25866 725/34 |
| 2013/0187926 | A1* | 7/2013 | Silverstein | G06F 16/80 345/440 |
| 2013/0218919 | A1* | 8/2013 | Solonchev | G06F 16/958 707/758 |
| 2013/0238449 | A1* | 9/2013 | Ferreira | G06Q 30/00 705/14.72 |
| 2014/0068549 | A1* | 3/2014 | Friedman | G06F 8/30 717/104 |
| 2014/0108129 | A1* | 4/2014 | Klein | G06Q 30/02 705/14.45 |
| 2014/0130182 | A1* | 5/2014 | Yackanich | G06Q 30/0269 726/27 |
| 2014/0201258 | A1* | 7/2014 | Jowett | H04L 67/2842 709/203 |
| 2014/0201615 | A1* | 7/2014 | Rajkumar | G06F 16/958 715/234 |
| 2014/0208199 | A1* | 7/2014 | Peleg | G06Q 30/0277 715/234 |
| 2015/0073922 | A1* | 3/2015 | Epperson | G06Q 30/0277 705/14.73 |
| 2015/0220990 | A1* | 8/2015 | Kobyakov | G06F 16/22 705/14.6 |

OTHER PUBLICATIONS

Sharethrough Unveils Its Sponsored Videos Platform To Deliver Native Ads _ TechCrunch (Year: 2012).*

How Your Content Distribution Can Use Native Advertising (Year: 2013).*

AdsNative Blog, AdsNative: Making of a Painkiller, Oct. 2012. http://blog.adsnative.com/?m=201210.

* cited by examiner

NATIVE ONLINE AD CREATION

CROSS REFERENCE TO OTHER APPLICATIONS

This application is a continuation of co-pending U.S. patent application Ser. No. 14/133,442, entitled NATIVE ONLINE AD CREATION filed Dec. 18, 2013 which is incorporated herein by reference for all purposes, which claims priority to U.S. Provisional Patent Application No. 61/738,881 entitled NATIVE ONLINE AD CREATION filed Dec. 18, 2012 which is incorporated herein by reference for all purposes.

BACKGROUND OF THE INVENTION

Native advertising (e.g., native sponsored content) is a form of digital advertising that resembles non-advertising content. A native advertisement may be presented in a computer-related display environment (e.g., on a webpage, application, video display, and/or any other computer-related environment). Native advertisements may include integrated ad units which have a similar appearance to the other content in the display environment (e.g., web page, etc.). Native advertisements may be placed on a display where non-advertising content appears rather than off to the side or in a position away from the content where ads are usually placed. The term "native" may refer to the fact that the ad unit appears "native" and/or blends in to the design of the display environment. Native ad units may include content elements (e.g., including headlines, images, embedded videos, text, etc.), which may resemble surrounding content elements (e.g., content elements of articles, article previews, blog postings, etc.) in the display. Typically, native advertisements may include a preview (e.g., an article brief) and full article displays, both of which may resemble non-advertising content in a display environment.

To deploy native advertising, content publishers to date typically have generated custom software. Such custom software may have to be generated for each native advertising deployment.

BRIEF DESCRIPTION OF THE DRAWINGS

Various embodiments of the invention are disclosed in the following detailed description and the accompanying drawings.

DETAILED DESCRIPTION

Figure 1:
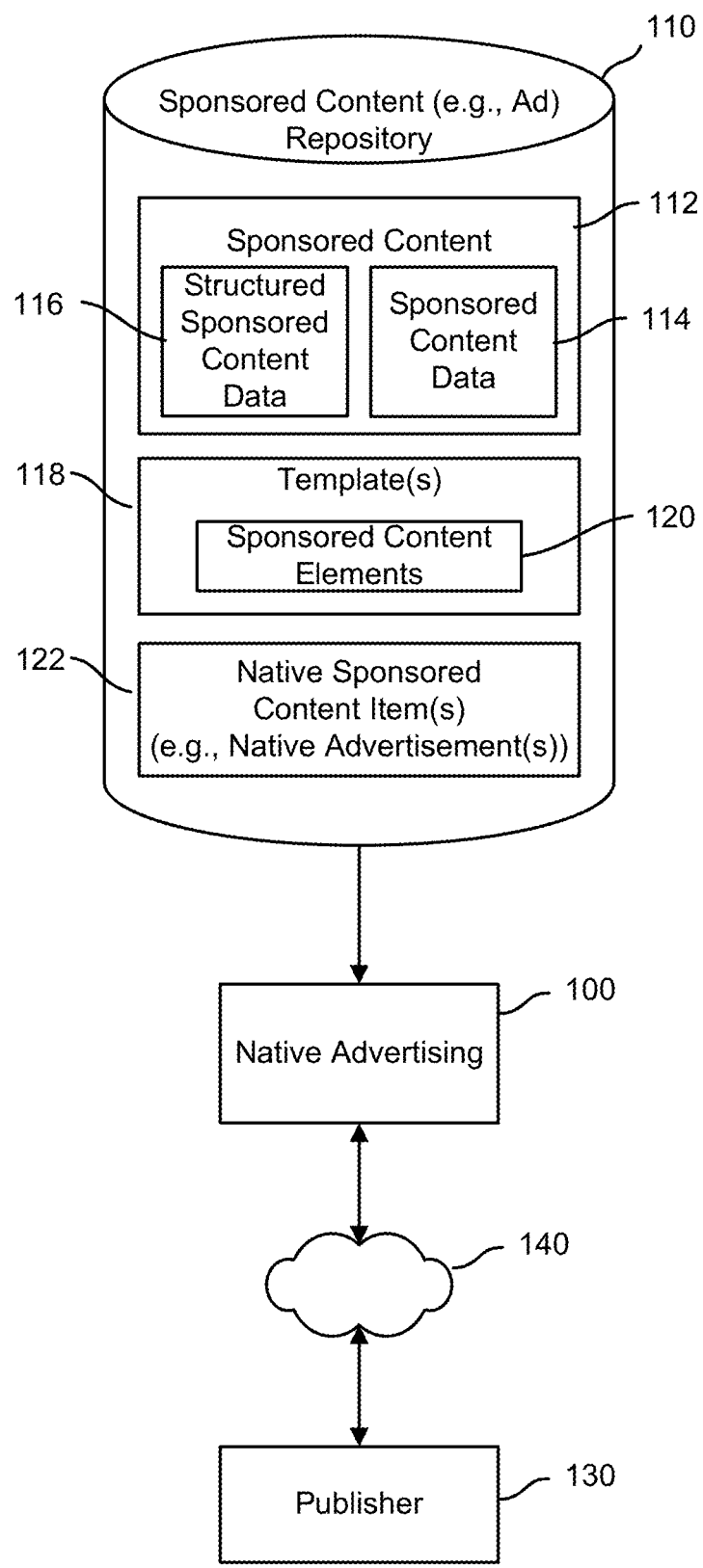
FIG. 1 is a diagram illustrating an embodiment of a system to create native online advertisements.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A tool for native online sponsored content (e.g., native advertisement) creation is disclosed. In various embodiments, an automated analysis tool uses elements of the design (e.g., layout, display attributes, etc.) of an existing article or other non-sponsored (e.g., non-advertising) content to generate a native sponsored content template. In some embodiments, an initial understanding of the structure and content of a selected article or other set of non-sponsored content selected in the context of a user interface of the analysis tool is refined and/or customized, e.g., by the content publisher or other user. Such a tool may be used by, for example, a content publisher to quickly and easily create native advertising for deployment in a publication. In some embodiments, a rendering of a native display page including one or more sets of selectable native hierarchical content elements may be provided. A selection of a set of the native hierarchical content elements may be received. A template may be generated based at least in part on a mapping of the selected set of the native hierarchical content elements to one or more sponsored content elements. In various embodiments, a template created as disclosed herein may be used by a back end user, process, and/or system to generate from existing and/or otherwise provided advertising (or other sponsored) content a native ad for a destination content page, such as a content publisher's web page, app display page, etc.

FIG. 1 is a diagram illustrating an embodiment of a system to create native online advertisements. In the example shown, a system to create/generate native advertising content 100 is associated with an advertising information repository 110. The sponsored content information repository 110 (e.g., advertising information repository) may include sponsored content 112 (e.g., promoted content, advertising content, sponsored content records), one or more templates 118 (e.g., native sponsored content templates), native sponsored content items 122 (e.g., native advertisements, pre-processed/assembled/generated native sponsored content items), and/or other information.

In some embodiments, the system 100 may communicate with publisher 130 (e.g., a computing device associated with a website publisher) via a network 140 (e.g., the Internet, local area network, wide area network, or any appropriate communication network). In various embodiments, system 100 may provide publisher 130 an interface (e.g., visual editor) configured to generate native sponsored content templates 118 as discussed below. According to some embodiments, system 100 may generate and/or serve display (s) of native sponsored content 122 to publisher 130 (e.g., for display on a website, publication, application, and/or other display context associated with publisher 130).

According to some embodiments, sponsored content 112 (e.g., advertising content) may include, for example, sponsored content data 114 (e.g., non-native sponsored content data, non-native advertising data), formatted sponsored content data 116 (e.g., structured sponsored content data), and/or other advertising/sponsored content-related data/information. Sponsored content data 114 may include text, images, videos, headlines, and/or other information for inclusion in sponsored content (e.g., advertising content). Sponsored content data 114 may include, in some embodiments, sponsored content data that has not been formatted, processed, parsed, and/or structured for use in a native sponsored content item 122. In some embodiments, sponsored content data 114 may be parsed, extracted, formatted, and/or processed (e.g., at run-time) to generate a native sponsored content item 122.

In various embodiments, structured sponsored content data 116 may include sponsored content data that has been formatted, processed, parsed and/or structured for use in a native sponsored content item. For example, a set of structured sponsored content data 116 may include headline text (e.g., "Acme Corp. Releases New Widget"), body text (e.g., a description of the benefits of the widget), image(s) (e.g., pictures of the widget), video (e.g., a demonstration of a person using the widget), and/or other data that may be used to generate a native advertisement (e.g., an advertising/sponsored content article about Acme Corp.'s new widget).

In some embodiments, one or more templates 118 may be used to generate a native sponsored content item 122. A template 118 may include sponsored content elements 120 (e.g., header element, body text element, image element, video element, etc.), layouts (e.g., position(s) of the sponsored content elements), patterns, formats, attributes (e.g., text size(s), font(s), color(s), dimensions, position, appearance characteristics, and/or other attributes), and/or other information used to generate a native sponsored content item 122. A template 118 may, for example, define the layout, pattern, position, and/or other attributes of one or more sponsored content elements. Sponsored content elements 120 may include fields, components, and/or elements of template 118 that define position(s), attribute(s), and/or other parameters of elements of a sponsored content item. For example, a template 118 may include one or more attributes associated with sponsored content elements 120 in a native sponsored content item article including article image attributes (e.g., whether or not to include a preview image, maximum/minimum width and height, position, maximum file size), headline attributes, article preview text attributes, author name attributes, article date attributes, article body attributes, article sharing link information, sponsored content disclaimer information, and/or any other parameters.

For example, a sponsored content element may define attributes (e.g., whether or not to display, text size(s), font(s), color(s), dimensions, position, and/or other attributes) associated with a header. Another sponsored content element 120 may define attributes associated with body text, another may define attributes associated with an image, etc. A template 118 may include these sponsored content elements and/or other sponsored content elements.

In some embodiments, a template 118 may be used to generate a native sponsored content item 122 (e.g., a native advertisement). Sponsored content data 114 (e.g., structured sponsored content data 116) may be retrieved, identified, selected, and/or arranged according to the template 118 (e.g., using the template 118 as a stencil to define the format, appearance, etc. of the native sponsored content item). In various embodiments, sponsored content data 114 (e.g., non-native format sponsored content) may be received and portions of the sponsored content data 114 corresponding to sponsored content elements 120 in the template 118 may be identified, extracted, and used to generate a native sponsored content item 122.

Figure 2:
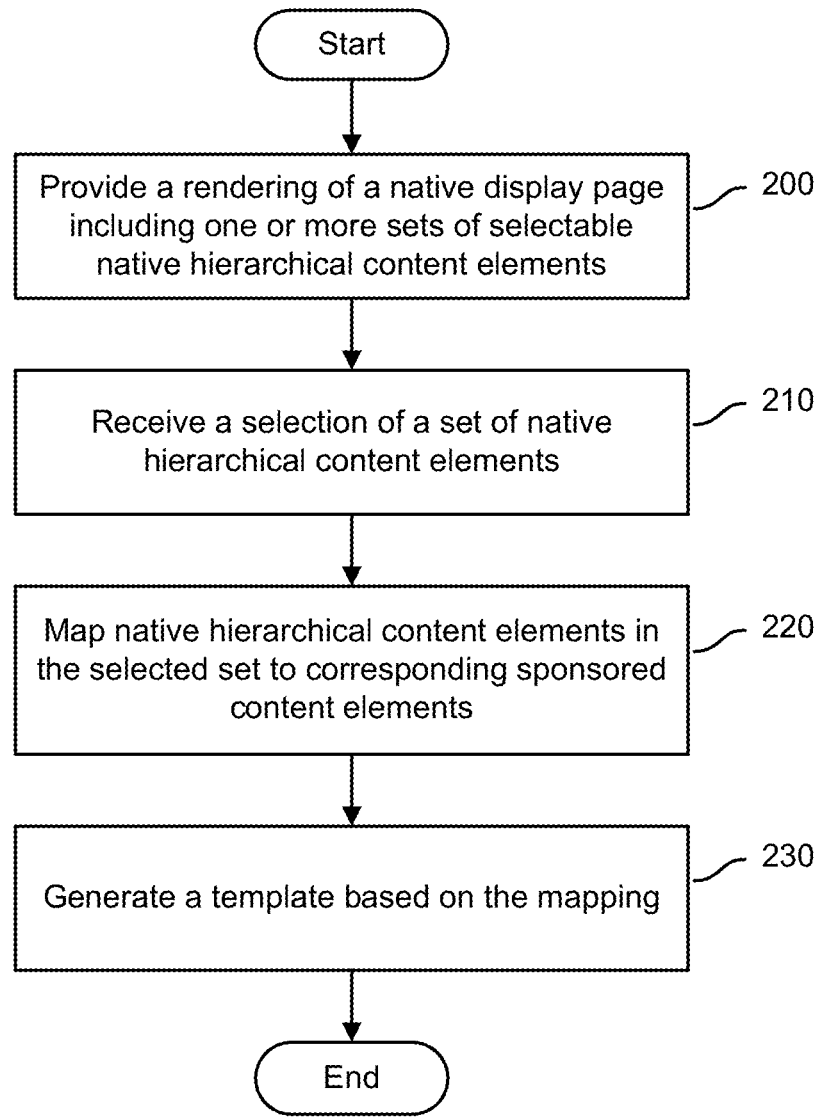
FIG. 2 is a flowchart illustrating embodiments of a process to generate a native sponsored content template.

FIG. 2 is a flowchart illustrating embodiments of a process to generate a native sponsored content template. In various embodiments, the process may be performed by system 100 depicted in FIG. 1. At 200, a rendering of a native display page including one or more sets of selectable native hierarchical content elements may be provided. In some embodiments, a rendering of a native display page may be a representation of a web-page, internet site, publication, application (e.g., mobile application), and/or other display.

In some embodiments, a rendering may be a version of a native display including native hierarchical content elements that match, correspond, and/or are associated with native content items on the native display page. For example, the rendering may be a representation of a website (e.g., a news, social media, blog, content feed, and/or any other type of website) that includes one or more sets of native content items (e.g., articles, article previews, etc.). The native display (e.g., website) may include a content well (e.g., a list, content area) including one or more native content items (e.g., article previews, articles, blog postings, etc.). A native content item may, for example, include one or more native content elements (e.g., headlines, body text, images, videos, etc.) The rendering provided (e.g., within a template generation user interface) may provide a representation (e.g., emulation) of the native display (e.g., of the website) including one or more sets of selectable native hierarchical content elements each corresponding to one or more of the native content items. The rendering may, in some embodiments, resemble (e.g., be substantially similar to) the appearance of the native display as rendered in a web browser, mobile device, and/or other environment discussed below.

According to some embodiments, a rendering may be generated based on one or more rendering environments (e.g., rendering/display contexts). Rendering environments may, for example, simulate rendering of the native display page on a personal computer (PC) (e.g., a web browser on a PC), mobile device (e.g., smartphone, tablet, etc.), a wearable computing device (e.g., a wearable computer, body-borne computer, computer-equipped eyeglasses, smart watches, computer-equipped clothing, etc.), smart television, computer-equipped appliance, and/or any other device. In some embodiments, a user may be provided an interface to select a rendering environment, and the rendering of the native display may be presented in a rendering environment based on the user's selection.

According to some embodiments, the rendering may include one or more native hierarchical content elements (e.g., native hierarchical content components). Native hierarchical content elements may be elements (e.g., components) of a content item (e.g., an article, article preview), the elements including, for example, a full article preview, full article, a headline (e.g., header), author, date, body text, preview text, image(s) (e.g., preview image(s)), video(s), and/or other elements. The native hierarchical content elements may be grouped, related, arranged, and/or associated in one or more hierarchical sets, groups, and/or blocks of native hierarchical content elements. For example, a set of native hierarchical content elements may include one or more content elements of an article display (e.g., a headline, body text, image(s), video(s), and/or other elements), and these content elements may be members of a set of native hierarchical content elements including the article. The hierarchy among a set of native hierarchical content elements may denote the relationship between the native hierarchical content elements. For example, a full article element may be higher in a hierarchy of content elements than a headline element.

The native hierarchical content elements may, in some embodiments, be configured to be selected (e.g., by a user).

At 210, a selection of a set (e.g., block, group, etc.) of native hierarchical content elements may be received. In some embodiments, native hierarchical content element(s) (e.g., included in the rendering of the native display page) may be highlighted and selected (e.g., by user) using a cursor (e.g., mouse cursor), touch interface, and/or other interface device, as discussed in detail below. The selection may be received, for example, by an analysis tool user interface code with which the rendering of the native display page is associated.

At 220, native hierarchical content elements in the selected set may be mapped to corresponding sponsored content elements. In some embodiments, a set of native hierarchical content elements may be selected, and each of at least a subset of the native hierarchical content elements in the selected set may be mapped to corresponding sponsored content elements. In some cases, the mapping may copy attributes associated with native hierarchical content elements in the selected set to the corresponding sponsored content elements. For example, attributes (e.g., size, text length, location on page, etc.) associated with the native hierarchical content elements (e.g., a headline element, body text element, image element, etc.) may be copied and applied to sponsored content elements (e.g., sponsored content headline element, body text element, image element, etc.). As a result of the mapping, the sponsored content elements may include attributes associated with the native hierarchical content elements. In some embodiments, at least one attribute associated with the sponsored content elements may match (e.g., substantially match, be substantially similar to) at least one attribute of the selected set of native hierarchical content elements.

At 230, a template may be generated based at least in part on the mapping. In some embodiments, a template may include one or more sponsored content elements. And, based at least in part on the mapping, attributes associated with the sponsored content elements may match attributes of the native hierarchical content elements (e.g., on the display page). The template generation process is discussed in further detail below.

In various embodiments, a place of the selected set of native hierarchical content elements within a hierarchy of the rendered native display page, and a location within the hierarchy of each selected element in the set, is determined and embodied in the template. For example, in a page in which successive sets of native content elements are displayed (e.g., such as a news feed, list of article previews, etc.), selection of the third set of native hierarchical content elements would result in the template embodying a selection of the third position as a position in which sponsored content having a native content appearance, generated based at least in part on the template, is to be included.

Figure 3:
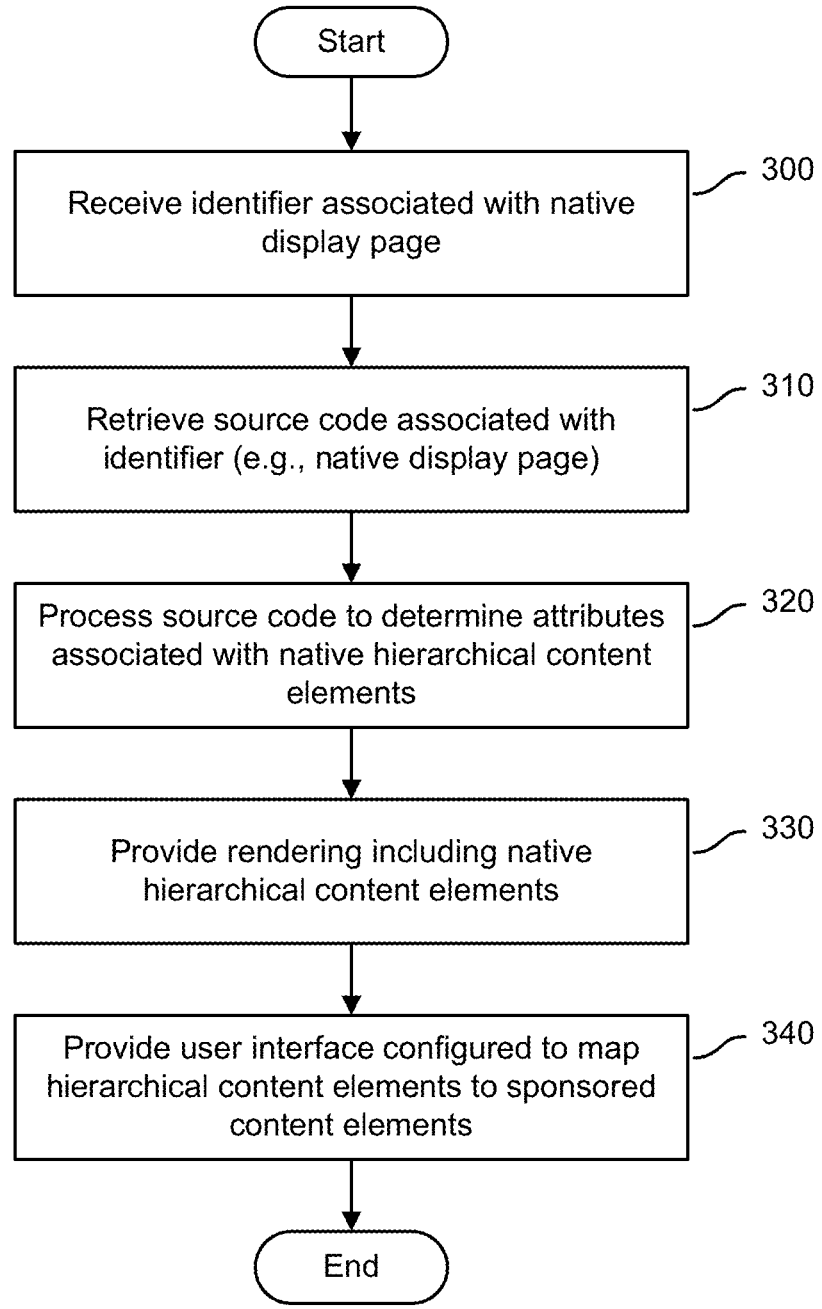
FIG. 3 is a flowchart illustrating embodiments of a process to provide a rendering of a native display of content elements.

FIG. 3 is a flowchart illustrating embodiments of a process to provide a rendering of a native display of content elements. In various embodiments, the process may be performed by system 100 depicted in FIG. 1. At 300, an identifier associated with a native display page may be received. An identifier associated with a native display page may include, for example, a uniform resource locator (URL), a hypertext transfer protocol (HTTP) address, and/or other identifiers associated with a native display page (e.g., webpage, web site). An identifier may also include information identifying an application (e.g., mobile application), program, and/or software. In some embodiments, a prompt may be output for a user to input an identifier, and an identifier associated with the native display page may be received.

At 310, source code associated with the identifier may be retrieved. In some embodiments, a URL of a publication (e.g., a webpage) may be received, and the source code associated with the URL may be retrieved. In various aspects, an identifier may be associated with an application, and source code associated with the application and/or other program may be retrieved.

At 320, the source code may be processed (e.g., parsed, analyzed, and/or otherwise processed) to determine one or more attributes associated with native hierarchical content elements of the native display. In some embodiments, source code associated with a native display page (e.g., a website, publication, etc.) may be processed (e.g., parsed) to identify the structure, layout, appearance, and/or other attributes of the native display. The source code may, for example, be processed to identify/generate native hierarchical content elements (e.g., headline(s), body text, image(s), video(s)) included in the code for the native display. The attributes associated with a native hierarchical element may be determined by parsing the source code associated with a native display to identify the portion(s) of source code associated with the native hierarchical content element. In some embodiments, the native hierarchical content elements may be hypertext markup language (HTML) and/or other types of elements.

In some embodiments, techniques (e.g., algorithms) may be used to detect various native hierarchical content elements based on patterns (e.g., known patterns, expected patterns, pre-defined patterns), such as font size, hypertext markup language (HTML) tags, relative position, number of occurrences of code, and/or other patterns to detect various native hierarchical content elements such as headline, preview text, author name, date, preview image, video, and/or other content elements. For example, a first native hierarchical content element (e.g., an article title element) may be differentiated from a second native hierarchical content element (e.g., an article preview text element) by comparing font sizes, character lengths, total dimensions and/or other parameters associated with source code elements. The portion(s) of the source code may be processed and/or analyzed to extract attributes associated with a native hierarchical element.

In some embodiments, attributes associated with the native hierarchical content elements, including the positioning, dimensions, and/or other attributes associated with native hierarchical content elements, may be determined using a web browser (e.g., a web browser on a PC, mobile device, etc.) For example, a native display page may be rendered (e.g., in the browser), and attributes associated with one or more native hierarchical content elements (e.g., HTML elements) may be determined by visually computing the style of each native hierarchical content element in the rendered display. The attributes (e.g., positioning, dimensions, and/or other attributes) may be determined based at least in part on the rendering of the native page in the browser.

In some embodiments, a native display page may include, for example, one or more sets of native hierarchical content elements, and each set of native hierarchical content elements may be identified. Sets of native hierarchical content may include one or more elements (e.g., headline, body text, image(s), etc.) of an article, article preview, blog posting, and/or other native content item. According to various embodiments, the source code may be parsed (e.g., processed) to determine a hierarchy, structure and/or relationship between native content elements (e.g., components) in a native content item (e.g., a set of native content elements). For example, a native display of an article preview may include an article preview element, headline element, a body text element, an image element, and/or other content elements. These elements may be determined to be members of a hierarchy of native content elements (e.g., content elements making up the article), and the hierarchy and/or other type of structure among the content elements may be determined. For example, the headline, body text, image, and/or other content elements may be determined to be child elements (e.g., children) of the preview article content element. This hierarchy may be utilized in generating native sponsored content item templates.

At 330, a rendering of the native page may be provided including one or more native hierarchical content elements. In some embodiments, a native page may be rendered in a browser, and attributes (e.g., positioning, dimensions, etc.) associated with the native hierarchical content elements may be determined visually based on the rendering of the elements in the browser.

According to various embodiments, a native display page may be rendered at a server (e.g., server-side) using a browser emulator, and the native page may be provided transparently (e.g., via the emulator) in a browser for a user. In some embodiments, rendering a native page server-side may allow a native page with deferred content (e.g., content that loads after the page loads, such as Asynchronous Javascript and XML (AJAX) applications) to be fully displayed. For example, the native page may be rendered on the server and after any deferred content is loaded (e.g., been rendered), a representation of the native page (e.g., a transparent display of the native page) may be provided (e.g., via a browser).

In some embodiments, the native display may include one or more selectable native hierarchical elements. The native hierarchical content elements may be displayed based at least in part on the one or more attributes associated with the native display page. One or more native hierarchical content elements may be arranged in a structure/hierarchy that corresponds with a structure of native content elements on the native display. Sets of native hierarchical content elements may embody the structure (e.g., hierarchy) of native content elements in a native display. For example, a set of native hierarchical content elements including a headline element, body text element, image element, video element, and/or other elements as rendered may embody the hierarchical structure as defined in the source code for the native display such that the set of native hierarchical content elements matches the appearance of corresponding elements in a native display.

In some embodiments, a set of native hierarchical content elements may be selected, and a template may be generated based at least in part on the selected set of native hierarchical content elements. The selected set of native hierarchical content elements may be mapped to sponsored content elements to generate the template, and the hierarchy associated with the selected set of native hierarchical content elements may be used to define attributes of the template.

At 340, a user interface configured to map one or more native hierarchical content elements to sponsored content elements may be provided. A template may be generated including the sponsored content elements, and a rendering of the native page including the template may be provided along with a template adjustment user interface. In some embodiments, the user interface may be configured to allow a user to adjust, modify, and/or change attributes associated with the template, sponsored content elements, and/or other items.

Figure 4:
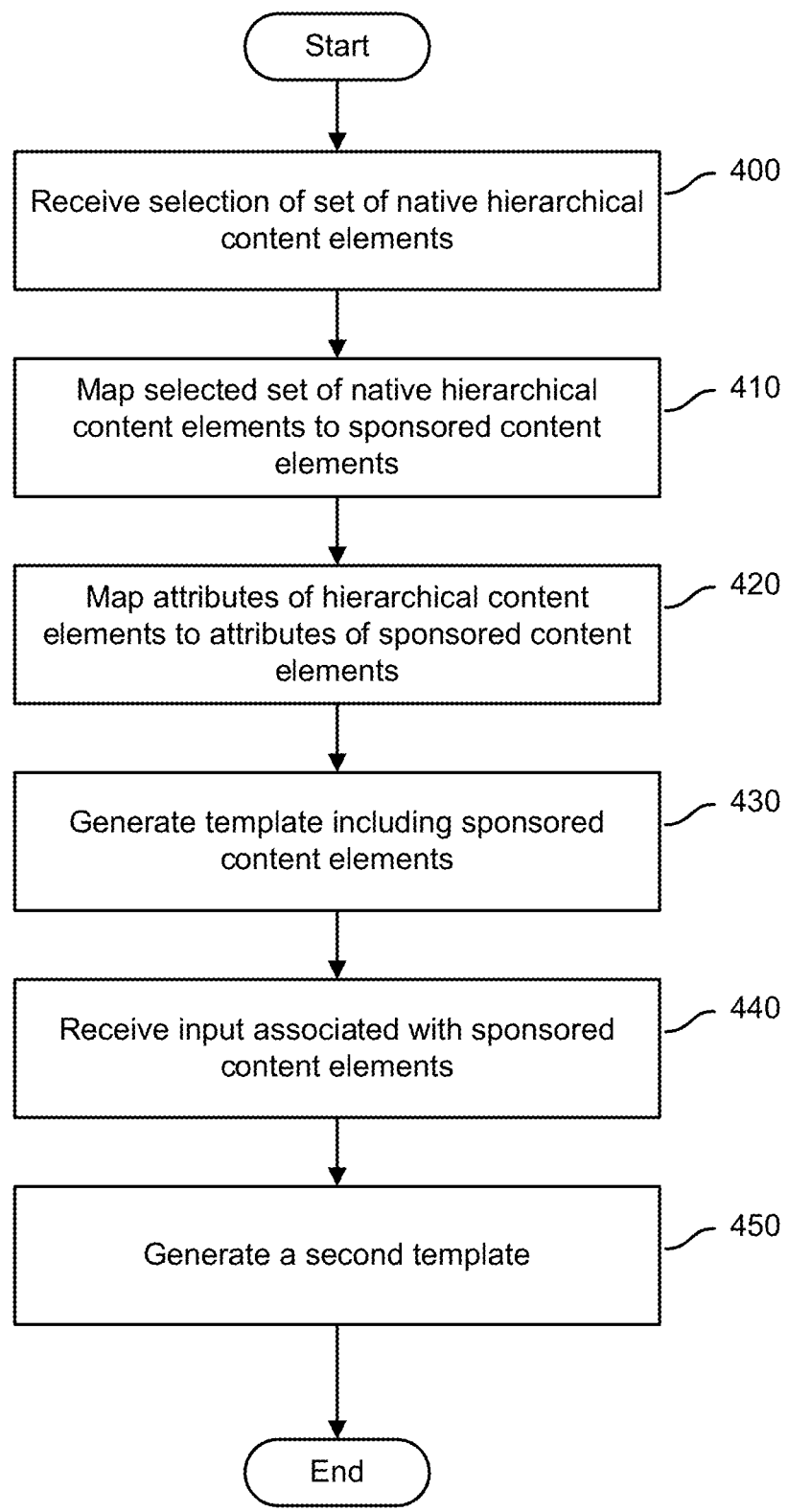
FIG. 4 is a flowchart illustrating embodiments of a process to generate a native sponsored content template.

FIG. 4 is a flowchart illustrating embodiments of a process to generate a native sponsored content template. In various embodiments, the process may be performed by system 100 depicted in FIG. 1. At 400, a selection of a set of native hierarchical content elements may be received. As discussed above, a rendering of a native display page may be provided including one or more native hierarchical content elements. The native hierarchical content element(s) may, for example, be highlighted and selected (e.g., by a user) using a cursor (e.g., mouse cursor), touch interface, and/or other interface device. For example, a cursor may be hovered over a native hierarchical content element and a border may be illuminated around the element. In various embodiments, a set of native hierarchical elements may be identified as a set of associated elements (e.g., a hierarchy of elements) in the rendering. For example, if a cursor is hovered over a headline native hierarchical content element, the headline element and other native hierarchical elements with which the headline is grouped may also be highlighted for selection. Thus, a selection of one native hierarchical content element may result in the selection of a set, group, and/or block of native hierarchical content elements. For example, if a headline element associated with an article is selected, the other native hierarchical content elements also associated with the entire article (e.g., including headline element, body text element, image element, etc.) may automatically be selected.

At 410, a selected set of native hierarchical content elements may be mapped to one or more sponsored content elements. In some embodiments, one or more native hierarchical content elements included in a selected set (e.g., group, block, etc.) of native hierarchical content elements may be mapped to (e.g., used to generate/assemble) one or more sponsored content elements. For example, a set of native hierarchical content elements may include an article preview element and one or more sub-elements including a header element, body text element, image element, and/or other elements. These elements may be mapped to sponsored content elements to generate a sponsored content preview element and one or more sub-elements including a sponsored content header element, body text element, image element, and/or other sponsored content elements. In various embodiments, a selected set of native hierarchical content elements may be mapped to a set of sponsored content elements such that a sponsored content element is created for each native hierarchical content element.

At 420, one or more attributes associated with the selected native hierarchical content elements may be mapped to attributes associated with the sponsored content elements. In some embodiments, a hierarchy, appearance, placement, and/or other attributes associated with the one or more native hierarchical content elements may be mapped to attributes associated with the sponsored content. In some embodiments, attributes associated with the native hierarchical content element may be matched (e.g., copied) to attributes associated with the sponsored content elements. For example, native hierarchical content elements associated with an article preview may be associated with a hierarchy (e.g., article preview element and sub-elements (e.g., headline, body text, image(s), etc.)), a placement in the display (e.g., below another article on the left column of a page), display/appearance attributes (e.g., font size(s), color(s), etc.), and/or other attributes. These attributes may be matched to attributes associated with the sponsored content elements such that the sponsored content elements include substantially similar (e.g., identical) hierarchy, placement in the display, display/appearance attributes, and/or other attributes as the native hierarchical content elements. In some embodiments, the sponsored content elements may match (e.g., substantially match) the set of native hierarchical content elements such that the sponsored contents elements may be substantially similar to, blend in with, and/or otherwise resemble the native hierarchical content elements in the native display.

In some embodiments, additional sponsored content elements may be generated and associated with the mapped sponsored content elements. For example, a set of native hierarchical content elements including an article preview, headline, body text, image, and/or other elements may be mapped to sponsored content article previews, headlines, body text, image, and/or other elements. The sponsored content elements may be associated with one another, for example, in a set, group, hierarchy, and/or other association of sponsored content elements. Other sponsored content elements may be added to the set of sponsored content elements including, for example, a sponsored placement tag (e.g., promoted placement tag, sponsored placement identifier) and/or other elements.

At 430, a template including the sponsored content elements may be generated. As discussed above, a set of one or more sponsored content elements may be generated, modified (e.g., based on user input), and/or otherwise processed. In some embodiments, a template may be generated including the sponsored content elements. The template may, for example, define attributes (e.g., placement, hierarchy, display attributes, etc.) of the sponsored content elements. According to various embodiments, the template may include at least one set of sponsored content elements, a placement of the at least one set of the sponsored content elements on the native display (e.g., below a native content item in the native display, adjacent to a native content item), and one or more display attributes associated with the at least one set of sponsored content elements. In some embodiments, the template may be used to generate native sponsored content as discussed in detail below. For example, a template may, in certain cases, define a placement of one or more sponsored content elements at a location in the native display adjacent to the native hierarchical content elements used to generate the template. In other words, the template may be generated such that a sponsored content item appears adjacent (e.g., directly below/above) native content items (e.g., article preview) used to generate the template.

In some embodiments, the template may be generated such that a sponsored content item replaces (e.g., takes the place of) a native content item. For example, the sponsored content elements may appear in the location on the page that the native content item was located. In some embodiments, a native content item may be pushed (e.g., moved) to another location, and the sponsored content item may appear in its place. For example, a sponsored content item may take the place of a native content item, and the native content item may pushed to a location adjacent to the sponsored content item (e.g., directly below the sponsored content item).

In some embodiments, a template may include code to remove, disable, and/or alter advertising technologies on a display page other than the native sponsored content item. For example, a native display (e.g., a full article native display as discussed below) may be analyzed to identify advertising technologies (e.g., pop-up advertisements, in image advertisements, contextual keyword advertisements, autoplay videos, and/or other advertisement technologies) associated with the native display. In some cases these advertising technologies may interfere with a native sponsored content item and should be disabled. In some embodiments, the advertising technologies may be disabled, deactivated, and/or removed. According to various embodiments, upon execution (e.g., at runtime), the template and/or associated code may interfere with the advertising technology to prevent it from functioning and interfering with the native sponsored content item. In various embodiments, code associated with the advertising technology may be removed from the source code for the native display page. According to some embodiments, a user (e.g., associated with the publication) may be provided the option to disable the advertising technologies.

In various embodiments, templates may include search engine-related tags to govern search results associated with a sponsored content item. Since a native sponsored content template may be used to deploy sponsored content data from advertisers that are appearing across many different publishers, the template may automatically have search engine tags added so that sponsored content data is not indexed like other non-sponsored content. For example, multiple copies of the same sponsored content may result in a reduced search engine ranking as the distribution of the same content across many sites is a strategy employed by search engine "spammers" trying to game search engine results. Thus, in certain cases, appropriate tags such as "no follow" and "do not index" tags may be automatically added to native sponsored content templates.

At 440, input associated with the sponsored content elements may be received. In some embodiments, a rendering of the template may be provided (e.g., to a user) along with a template adjustment/modification user interface. According to various embodiments, input associated with one or more attributes of the sponsored content elements may be received. For example, input may be received to modify, adjust, and/or change the position of sponsored elements, the number of characters (e.g., maximum/minimum length) associated with a sponsored content element, the font(s) and/or color(s) associated with sponsored content elements, the size of sponsored content images, and/or any other attributes associated with sponsored content elements. In some embodiments, sponsored content elements may be added and/or deleted based on received input.

At 450, a second template may be generated. In some embodiments, a second template may be generated based at least in part on a mapping of a second set of native hierarchical content elements to one or more sponsored content elements. In various embodiments, the second set of native hierarchical content elements may be associated with a second native display page that is related to (e.g., associated with) the native display page used to generate the first template (e.g., the template discussed above in step 440).

According to some embodiments, a second native display page may include a full article page associated with the article preview (e.g., the selected set of native hierarchical elements) on the first native display page. For example, the first native display page may include one or more article previews, and the selected set of native hierarchical content elements may be associated with an article preview. The selected set of native hierarchical content elements (e.g., the article preview) on the first native display may be associated with a second set of native hierarchical content elements (e.g., elements of the full article) on the second native display. In some embodiments, a first template (e.g., including article preview elements) and/or attributes associated therewith may be used to generate a second template (e.g., associate with a full article). For example, attributes associate with an article preview embodied in a first template may be used to generate a second template for the full article (e.g., associated with the article preview). In some embodiments, the first (e.g., article preview) and second (e.g., full article) templates may be associated and may be used to generate the preview and full article native sponsored content items. In some embodiments, attributes (e.g., appearance characteristics, placement, etc.) of the second template (e.g., associated with the full article display) may be modified using the techniques discussed herein. In various embodiments, search tags may be associated with the second template (e.g., the full article template) using the techniques discussed herein.

According to various embodiments, a second native display page (e.g., associated with the first native display page used to generate the first template) may be a display page associated with a section of a website that includes the first native display page. For example, a publication (e.g., a news website) may include a main page, finance page, entertainment page, technology page, and/or other pages, and the template generation process may be repeated for one or more of the sections (e.g., each section) of the publication.

In some embodiments, a first template associated with article preview elements and a second template associated with a full article may be automatically generated (e.g., automatically assigned) for one or more sections of a publication. In some embodiments, one or more sections (e.g., pages) of a publication may include similar layout, appearance, and/or other attributes. The article brief and full article templates generated for the sections of a publication may therefore be similar (e.g., identical) from section to section. To determine whether sections of a publication (e.g., two or more sections) are similar, each of the sections may be compared (e.g., programmatically) to identify similarities between the sections (e.g., within certain tolerances). For example, pages or sections that have a same structure, number and/or size of content items, type of content (e.g., images, etc.), display attributes (e.g., background color), same or parallel location with a URL or other naming scheme, etc. may be determined programmatically, with or without human confirmation in various embodiments, to be sufficiently similar to potentially be able to use the same or a very similar template to generate sponsored content having a native appearance. In the case in which two sections are similar, for example, a first template generated for the first section of the website may be suggested for reuse in the second section of the website. In various embodiments, a first template generated for a first section of a website may be reassigned for use with a second section of the website.

In some embodiments, the first template generated for the first section of the website may be used as the basis for a second template for the second section (e.g., the first template may be modified for use with the second section). In some embodiments, an article preview template and an accompanying full article template may be generated for the second section and any other sections of a publication (e.g., substantially similar sections of the publication).

In some embodiments, one or more (e.g., all) sections of a publication may be selected for automatic template generation. For example, a user may select an option to generate templates for all appropriate sections of a publication (e.g., all sections with content). The one or more sections of the publication may be crawled to automatically detect sections of the publication with content. For example, it may first be determined whether a section/page includes content before generating a template to reduce the likelihood of generating sponsored content item templates for non-content sections/pages of a publication (e.g., "About Us," "Contact Us," and "Privacy Policy" pages). It may be determined that a page of a publication does not include content and/or is suitable for native sponsored content placement by identifying keywords, code, and/or other elements that are consistent with non-content pages. In some cases, it may be determined that a page is unsuitable for native sponsored content if the page does not include elements typically found in content-bearing pages (e.g., article elements, advertising, and/or other elements).

Figure 5:
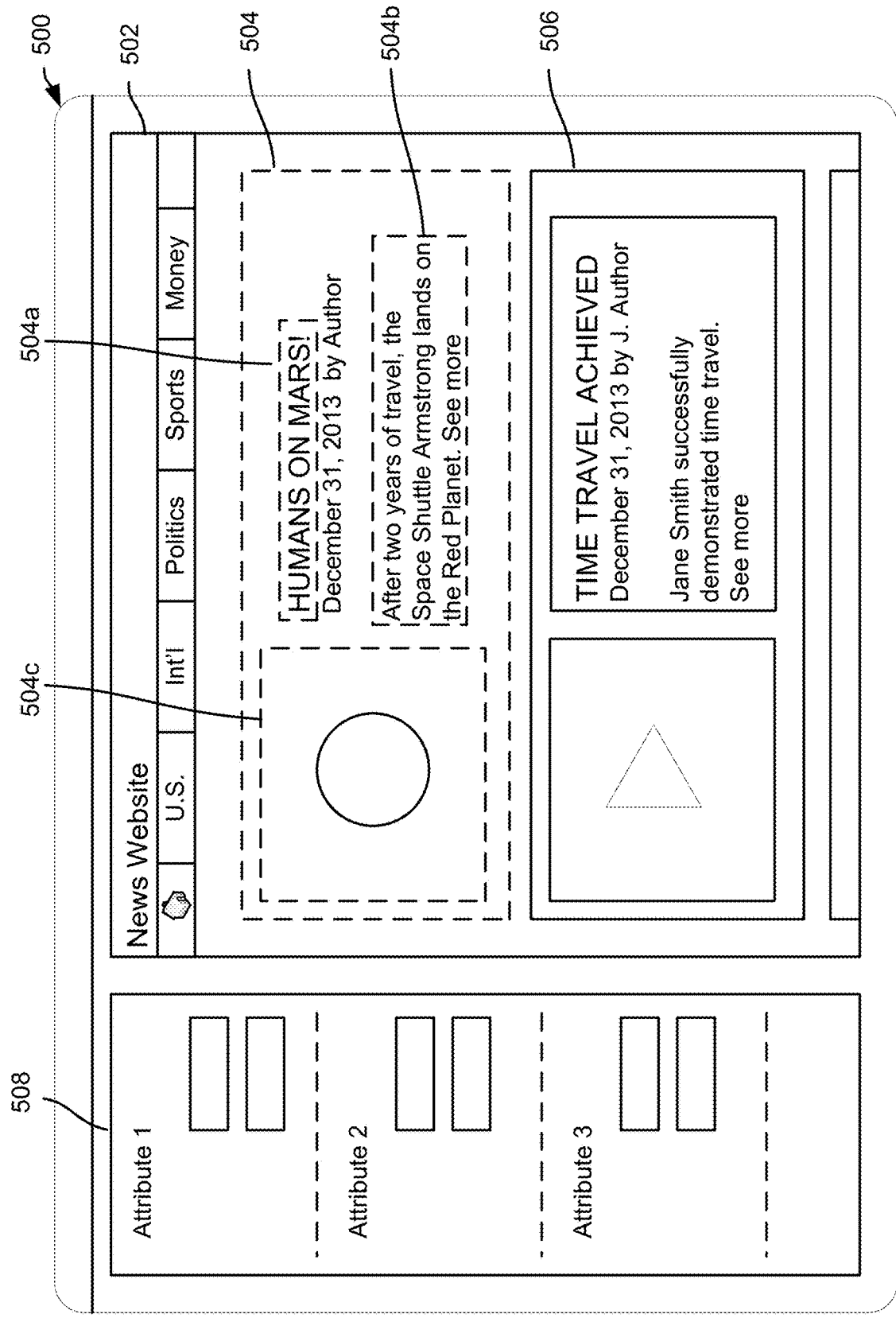
FIG. 5 is a diagram depicting an embodiment of an interface to generate sponsored content item templates.

FIG. 5 is a diagram depicting an embodiment of an interface to generate sponsored content item templates. In the example shown, an interface 500 may be provided (e.g., in a web browser, application, etc.) for generation of native sponsored content templates. The interface 500 may include a rendering of a native display 502 (e.g., a website, publication, etc.), which may include one or more sets of native hierarchical content elements 504, 506. For example, a set of native hierarchical content elements 504 (e.g., elements associated with the article brief) may include a headline content element 504a, a body text element 504b, an image element 504c, and/or other elements (e.g., date element, author element, video element, etc.). The rendering of the native display page 502 may be configured to allow a user to hover their cursor over a native hierarchical content element (e.g., headline element 504a), and an outline (e.g., as shown in dashed lines) may be displayed around that element 504a. An indication of a selection of a native hierarchical content element (e.g., headline element 504a) may be received (e.g., when a user clicks on a native hierarchical content element). In some embodiments, upon receipt of a selection of a native hierarchical element (e.g., headline element 504a), the set (e.g., group) of native hierarchical elements 504 of which the selected native hierarchical element is a member may be determined. In certain cases, the boundary around the set of native hierarchical elements 504 may be highlighted indicating that the set has been selected. Upon receipt of the selection, the set of native hierarchical elements 504 may be used to generate a template (e.g., a native sponsored content template) using the techniques disclosed herein.

In some aspects, an attribute modification interface 508 (e.g., native content element adjustment interface) may be provided in the interface 500. The attribute modification interface 508 may be configured to allow for adjustment of attributes associated with native hierarchical content elements 504, 504a, 504b, and 504c.

Figure 6:
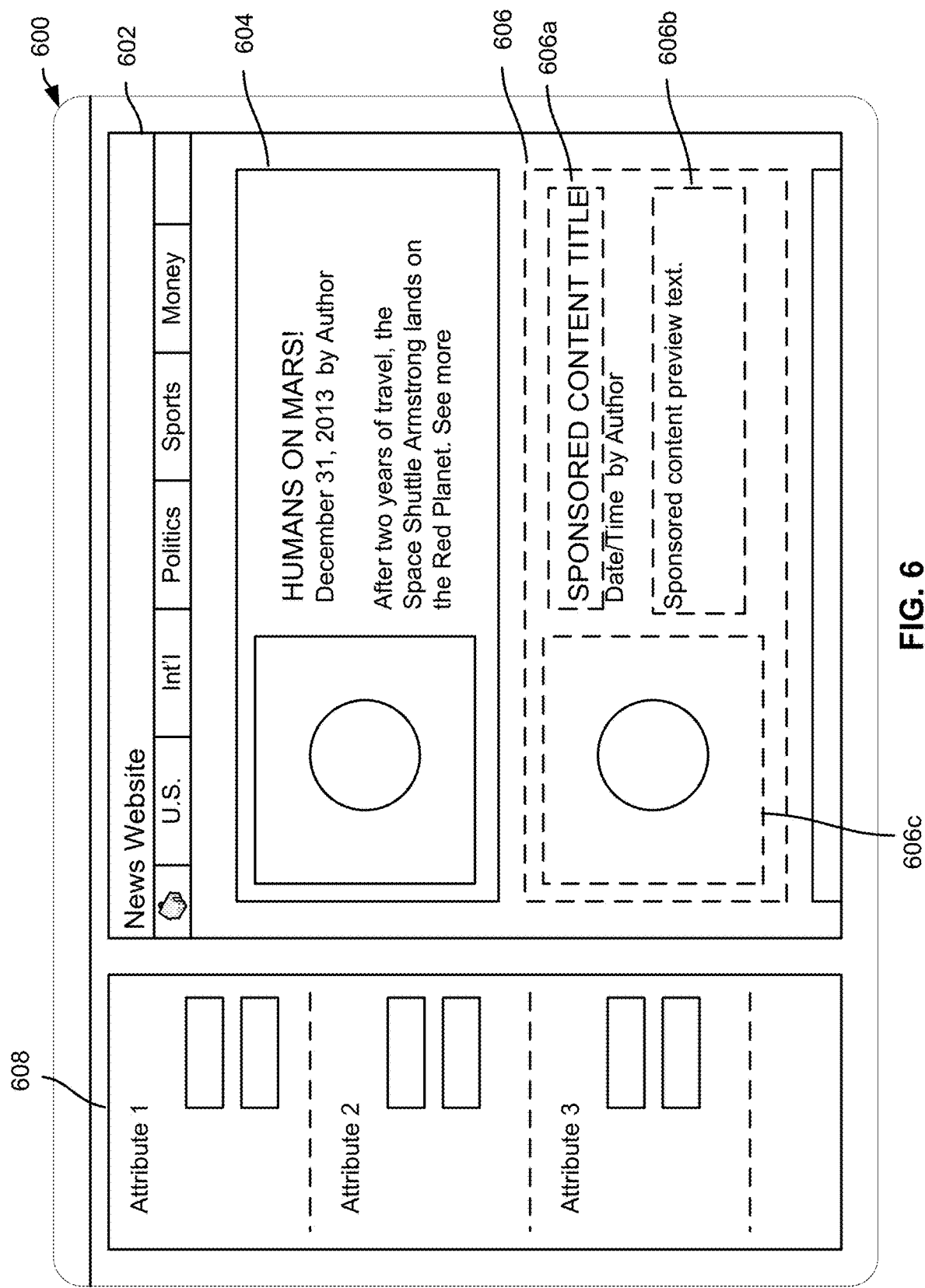
FIG. 6 is a diagram depicting an embodiment of an interface to adjust sponsored content item templates.

FIG. 6 is a diagram depicting an embodiment of an interface to adjust sponsored content item templates. In the example shown, an interface 600 may be provided including a rendering of the native display page 602 including native content item 604 (e.g., including one or more native content elements), a rendering of a template 606 (e.g., a native sponsored content template), and/or other elements. In some embodiments, the template 606 may be displayed in the location on the display page 602 at which native sponsored content items may be displayed (e.g., at runtime, upon deployment). For example, a template 606 may be placed adjacent to the native content item 604 (e.g., set of native content elements) used as a basis (e.g., copied) to generate the template 606. The position/location of the template 606 may be changed in the native display by, for example, clicking and dragging the template to a new location.

In various embodiments, the template 606 may include one or more sponsored content elements including a header sponsored content element 606a, body text sponsored content element 606b, image sponsored content element 606c, a date sponsored content element, an author sponsored content element, and/or other elements. As discussed herein, attributes associated with the template 606 and/or the sponsored content elements 606a, 606b, 606c included in the template may be associated with attributes of the native hierarchical content element(s) 604 used to generate the template.

According to various embodiments, the interface 600 may include a template modification/adjustment interface 608 (e.g., sponsored content element adjustment interface). The template adjustment interface 608 may be configured to allow for adjustment of attributes associated with the template 606, sponsored content elements 606a, 606b, 606c, and/or other elements of the native display 602. For example, attributes associated with the sponsored content elements 606a, 606b, 606c including position on native display, font, color, maximum/minimum length, image size and/or other attributes may be adjusted using the interface 608. In some embodiments, sponsored content elements may be added or removed using the interface 600. The interface 600 may allow a user to custom tailor a wide range of attributes associated with the native sponsored content template 606.

Figure 7:
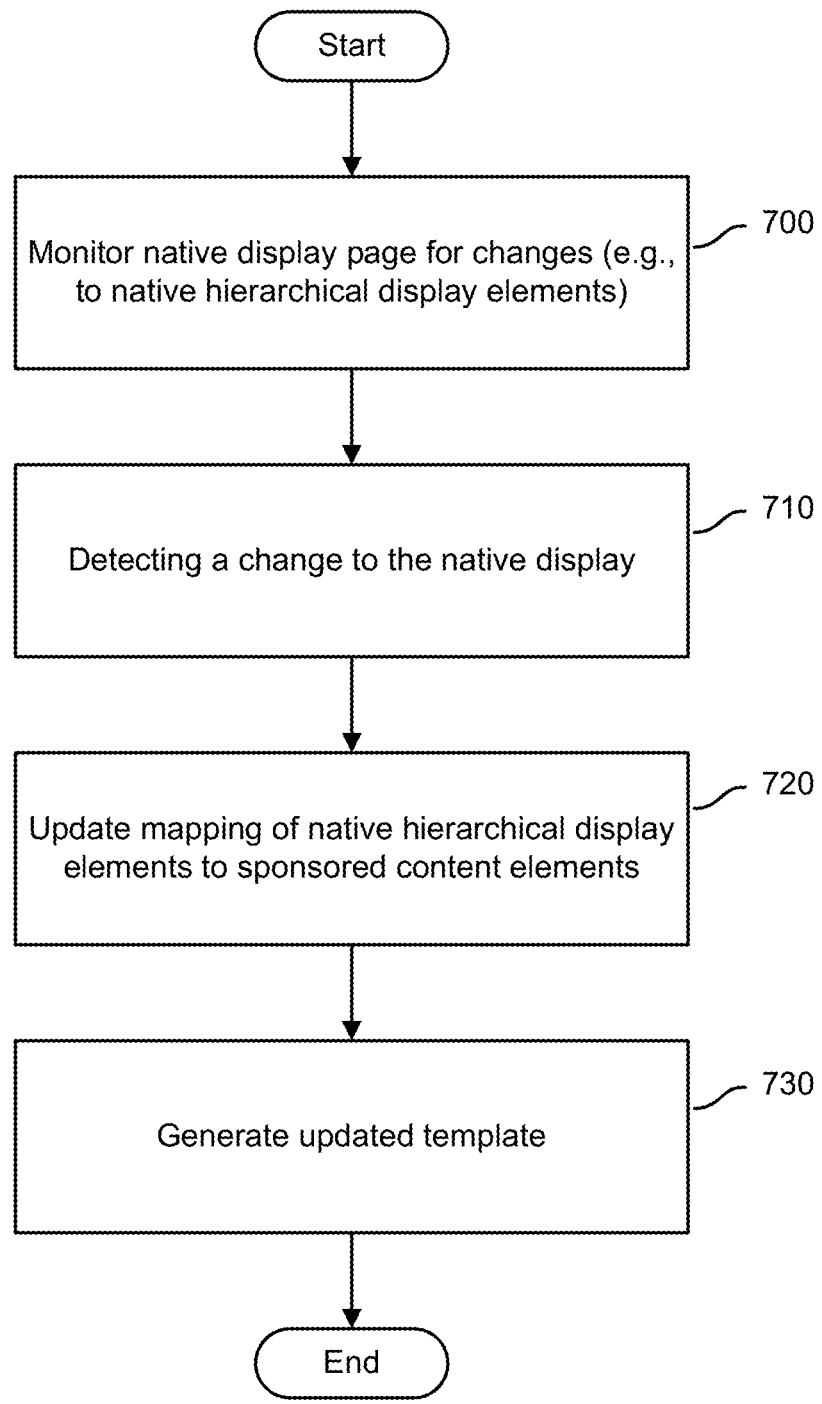
FIG. 7 is a flowchart illustrating embodiments of a process to monitor and/or update a native content item template.

FIG. 7 is a flowchart illustrating embodiments of a process to monitor and/or update a native content item template. In various embodiments, the process may be performed by system 100 depicted in FIG. 1. At 700, a native display page may be monitored for changes. In some embodiments, a native display associated with a template may be monitored to identify changes (if any) to one or more native hierarchical content elements used to generate a template. In various embodiments, all native hierarchical content elements associated with a native display may be monitored. For example, article preview(s) (e.g., set(s) of native hierarchical content elements) and/or full article(s) used to generate a template may be monitored to identify if the publication changes. The publication may be monitored for changes such that the template generated for use with the display page may be updated to match any changes, and appear native to the changed publication.

At 710, a change to a native display page may be detected. In various embodiments, changes to a native display may be detected/identified by recording the attributes (e.g., layout characteristics, font size, colors, position, hierarchy, etc.) of the native hierarchical content elements on a native display. In some embodiments, a hash or other value representing a set of attributes, such as structure, etc., considered to be characteristic of the native appearance of the display page may be stored and compared to a corresponding value as computed at a subsequent time to determine whether the values are the same. If not, it is determined that the display page may have been changed in a way that may matter, e.g., in terms of the suitability for continued use of the previously-generated template. In the event that attributes are changed, a change event may be triggered. In some embodiments, tolerances (e.g., change tolerances) may be employed such that minor changes to a native display (e.g., an article briefly appearing without an image, removal of one native hierarchical element from a set, etc.) do not trigger an immediate flag (e.g., trigger a detection/identification event).

At 720, a mapping of native hierarchical content elements to sponsored content elements may be updated. In some embodiments, upon detection of a change to a native display, one or more updated native hierarchical elements may be mapped to sponsored content elements to generate an updated mapping. By updating the mapping, the sponsored content elements (e.g., included in a template) may substantially match (e.g., resemble) an updated appearance of the native display.

At 730, an updated template may be generated. In some embodiments, an updated template may include the updated sponsored content elements, which substantially match the attributes of the changed native display page. The updated template may be generated using any of the techniques discussed herein. By way of example, a template for a native sponsored content article preview may be updated to match the content of an updated native display so that the sponsored content substantially matches (e.g., does not look out of place in) the updated native display.

Figure 8:
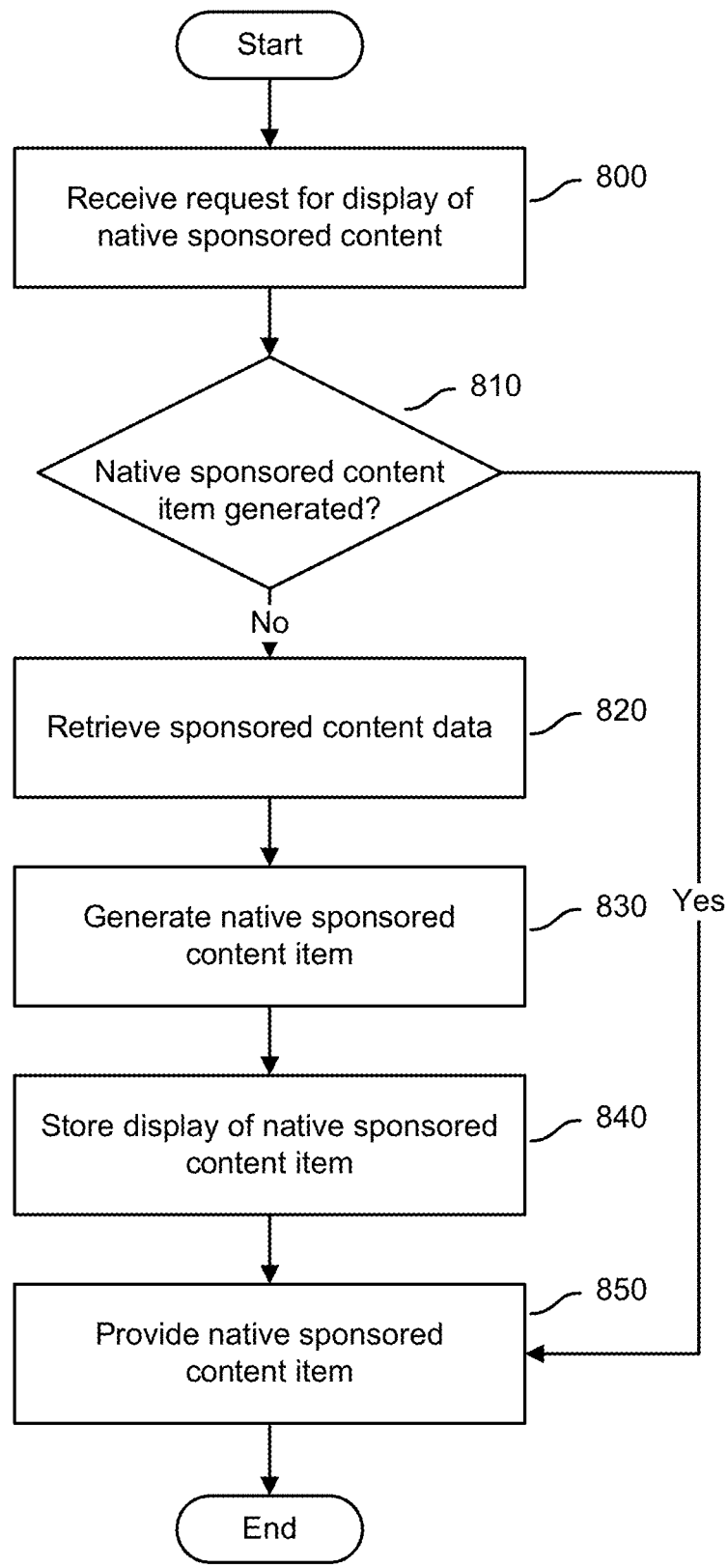
FIG. 8 is a flowchart illustrating embodiments of a process for generation of native sponsored content.

FIG. 8 is a flowchart illustrating embodiments of a process for generation of native sponsored content. In various embodiments, the process may be performed by system 100 depicted in FIG. 1. At 800, a request (e.g., a call) for a native sponsored content item may be received. In some embodiments, a publication (e.g., associated with a native display) may request (e.g., make a call for) a sponsored content item (e.g., a native advertisement) for display in a native display page. The native display page may, for example, include a native display page used to generate a template using the techniques described herein. In some embodiments, a template may be embedded in the code for the native display page and may include code to retrieve native sponsored content data for display in the native display page. According to various embodiments, the template may be stored in a repository associated with sponsored content, and a call may be received from code associated with the page to generate a native sponsored content item using the template. In various embodiments, a call may be made at run-time (e.g., when a native display page is loaded in a browser, application, etc.) to a native sponsored content generation system (e.g., system 100 of FIG. 1) requesting generation of a native sponsored content item.

At 810, it may be determined whether a native sponsored content item has been generated (e.g., pre-assembled, pre-generated). According to some embodiments, it may be determined that the native sponsored content item formatted for display in the native display (e.g., in response to the request) has not been generated. In this case the process may proceed to step 820, and a native sponsored content item may be generated.

In some embodiments, one or more sponsored content items(s) may be generated prior to run-time and stored for deployment (e.g., serving) at run-time (e.g., upon request from code in a native display or at other times as discussed above). The techniques for generating a native sponsored content item prior to run-time (e.g., pre-generating and/or pre-processing native sponsored content items) may be substantially similar to the process for native sponsored content item generation discussed below. Upon determination that a native sponsored content item has been pre-generated, the process may proceed to step 850, where the native sponsored content item may be deployed.

At 820, sponsored content data may be retrieved. In some embodiments, sponsored content data may be received from a repository associated with a native sponsored content generation system (e.g., system 100 of FIG. 1), from a third party sponsored content repository, and/or other sources. For example, native sponsored content data may be provided from a repository associated with the system/service that generated the native sponsored content generation template (e.g., a native sponsored content template provider). Alternatively, sponsored content data may be retrieved from a third-party source of sponsored content data (e.g., an ad serving organization), and a native sponsored content item may be generated based at least in part on the native sponsored content template.

At 830, a native sponsored content item may be generated. In various embodiments, a native sponsored content item (e.g., a native advertising display) may be generated based at least in part on a template. In some embodiments, the techniques described herein allow for a native sponsored content item to be generated from non-native sponsored content data retrieved in a wide variety of formats. In some embodiments, non-natively formatted sponsored content data may be retrieved and formatted for inclusion in a native sponsored content item. For example, the sponsored content data (e.g., associated with one advertisement) may be identified, extracted, reformatted, and/or arranged according to the sponsored content elements, attributes, and/or parameters included in a template to generate a native sponsored content item. By way of example, non-native sponsored content data (e.g., comprising one advertisement) may be parsed to identify data for inclusion in the sponsored content elements of the template. For example, sponsored content data may be mapped to headline sponsored content data, body text sponsored content data, image sponsored content data, etc. Each of the mapped sponsored content components may be formatted for display according to the attributes included in the template.

In some embodiments, because the sponsored content elements in the template substantially match the attributes of other native content elements on the native display, the sponsored content item generated using the template may match the attributes (e.g., appearance) of the native content items (e.g., article previews, blog postings, etc.) in the native display. In some embodiments, the template may include attributes associated with one or more rendering environments (e.g., desktop browser, mobile device, wearable computer, appliance, smart television, etc.) and the native sponsored content item may be formatted for display in the rendering environment.

In some embodiments, sponsored content data associated with multiple sets of sponsored content data (e.g., multiple advertisements) may be processed to generate multiple native sponsored content items (e.g., using the techniques described above). The multiple native sponsored content items may be analyzed (e.g., based at least in part on a confidence of mapping of sponsored content data to sponsored content elements in the template and/or other parameters) to rank the native sponsored content items. In some embodiments, higher ranked native sponsored content items may be weighted more heavily in a process to select a native sponsored content item to be served and/or displayed.

In some embodiments, different combinations of sponsored content data (e.g., advertising data associated with an advertisement) may be used to generate (e.g., using a template) a sponsored content item. For example, different headlines, preview text combinations, preview images, etc. may be used (e.g., dynamically) to generate multiple sponsored content item versions associated with the same sponsored content data (e.g., advertisement). The multiple sponsored content item versions may be selected and/or provided at random, according to a serving weight, and/or based on other parameters. Based at least in part on the measured level of effectiveness (e.g., as discussed below) of a native sponsored content item, a weight associated with a native sponsored content item version may be adjusted. In some embodiments, different versions of sponsored content data (e.g., different versions of a sponsored content headline) may be AB tested by measuring and/or comparing the level of effectiveness of sponsored content items including the different versions of sponsored content data.

At 840, a native sponsored content item may be stored. In some embodiments, native sponsored content items may be generated using the techniques discussed above and one or more native sponsored content items may be stored/saved (e.g., in the sponsored content repository 110 of FIG. 1) for deployment at a future time. As discussed above, native sponsored content items (e.g., native advertisements) may be assembled, generated, and/or warmed prior to runtime. At runtime (e.g., upon receipt of request for native sponsored content item), the previously generated native sponsored content items may be quickly and/or efficiently deployed to a publication for inclusion in a native display.

At 850, a native sponsored content item may be provided. In some embodiments, the native sponsored content item may be provided for display in a native display page (e.g., associated with a publication). In various embodiments, using the techniques disclosed herein a publication may sell sponsored content units to advertisers and/or generate revenue by carrying native sponsored content.

Figure 9:
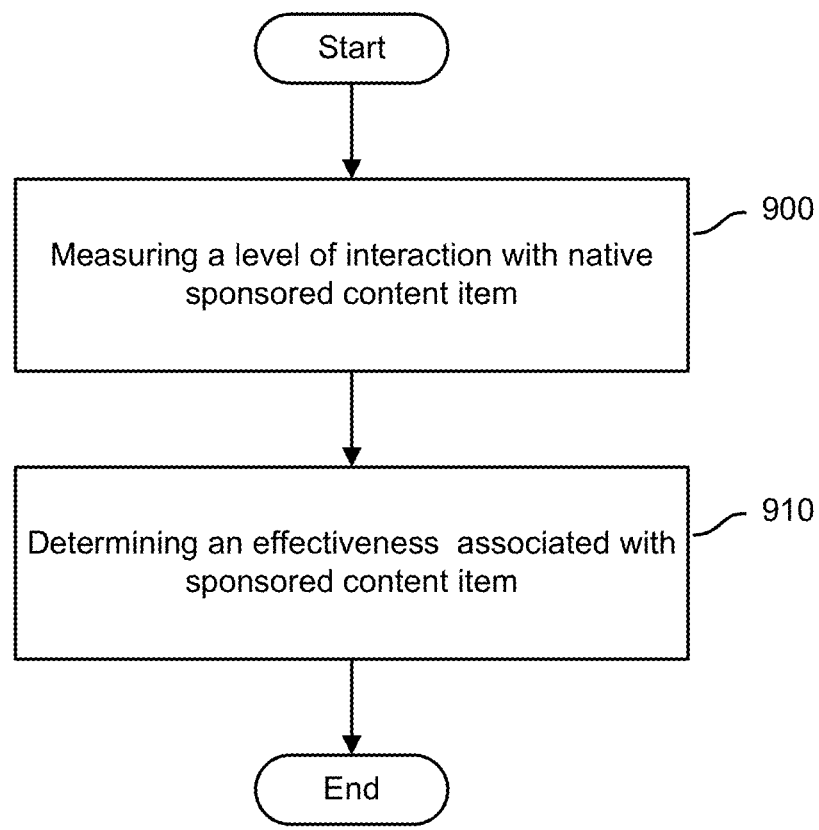
FIG. 9 is a flowchart illustrating embodiments of a process to measure effectiveness of a native sponsored content item.

FIG. 9 is a flowchart illustrating embodiments of a process to measure effectiveness of a native sponsored content item. In various embodiments, the process may be performed by system 100 depicted in FIG. 1. At 900, a level of interaction with a native sponsored content item may be measured. In some embodiments, a native sponsored content item may be provided (e.g., in a publication), and interaction with the native sponsored content item may be monitored. Interaction may include, for example, a number of clicks associated with the native sponsored content item, time spent viewing the native sponsored content item, purchases associated with the native sponsored content item, and/or other indicators of engagement/interest.

At 910, an effectiveness associated with the native sponsored content item (e.g., native advertisement) may be generated. In some embodiments, an effectiveness parameter may represent a level of user engagement with the native sponsored content item and may represent a value (e.g., to a publisher, advertiser, etc.) of the native sponsored content item.

In various embodiments, a process such as the process of FIG. 9 may be used to determine, e.g., generically for display pages, pages of a particular type, pages of a particular publisher, a particular page, etc., a probability of user viewing and/or other engagement with each of a plurality of regions of a page. In some embodiments, such information may be used to provide to a user, for example in the context of a user interface such as those shown in FIGS. 5 and 6, an expected degree of user engagement with sponsored native content at different locations in a page or other display. In some embodiments, the expected value of placements in each of one or more given locations in a page may be computed and a representation thereof displayed to a user in the context of a native content analysis and template generation tool, such as those disclosed herein, to enable a user, for example, to try out a number of different possible locations for sponsored content on the page and to see for each and therefore compare among them the financial return (e.g., advertising or other fees) that may be expected to be received depending on which location is selected to display sponsored content.

Figure 10:
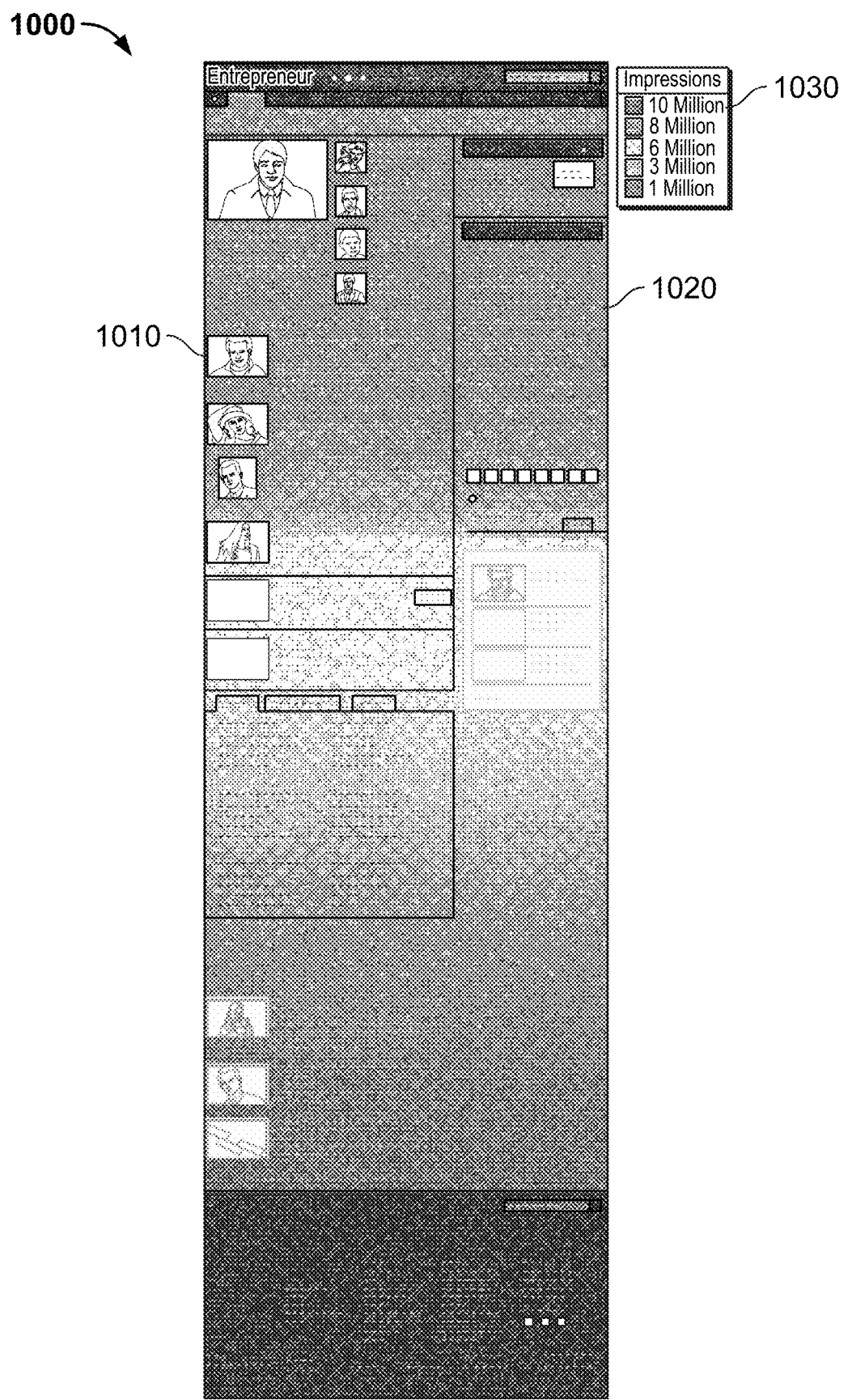
FIG. 10 is a diagram illustrating an embodiment of a rendering of a native display page including viewability indicators.

FIG. 10 is a diagram illustrating an embodiment of a rendering of a native display page including viewability indicators. A rendering of a native display page 1000 may be provided. The rendering of the native display page 1000 may include one or more native content items 1010 (e.g., associated with a set of native hierarchical content elements), one or more viewability indicators 1020, a viewability indicator legend/key 1030, and/or other components. In some embodiments, the rendering of the native display page 1000 may include viewability indicators (e.g., a heat map), which provide a visual representation of how often (e.g., a frequency at which) portions of a display page are typically viewed (e.g., by visitors to the display page). For example, the rendering of the native display page 1000 may allow users (e.g., publishers) to visually determine the viewability of native sponsored content item location(s) (e.g., on a portion of the native display page). Viewability may include how often the native sponsored content item is viewable and on the screen (e.g., for a minimum amount of time) on the viewer's device screen. A heat map with viewability indicators 1020 (e.g., color gradients) may be used to show what percentage of users scroll to a certain area of the publication. The viewability indicators may be determined in some embodiments by data collected from code associated with the native display page, code used to process the native display page (e.g., JavaScript), and/or other techniques.

In some embodiments, code (e.g., JavaScript) may be installed by a publisher onto a native display page to generate the heat map. This code may record a lowest page position reached by each individual user of the publisher's site. This data may be used to determine how far (e.g., how much) a user scrolled down on any given native display page. This data may be represented by colors (e.g., viewability indicators 1020) giving the publisher a visual representation of their available inventory. A corresponding legend 1030 may inform publishers what values are being represented by each color. This tool may allow publishers to determine a best location to place their native sponsored content for optimal viewability to maximize revenue earned from advertisers. For example, the color and corresponding data may determine how much viewable inventory exists within a certain position on a page.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   parsing source code of a native display page to determine a plurality of native hierarchical content elements of the native display page and one or more attributes associated with the plurality of native hierarchical content elements of the native display page;
   processing the parsed source code to determine one or more hierarchically related sets of native hierarchical content elements comprising the native display page, each set comprising a content item comprising the native display page;
   mapping each of at least a subset of the native hierarchical content elements in each of said sets of native hierarchical content elements to one or more corresponding content elements, wherein the mapping includes copying the one or more attributes associated with the native hierarchical content elements in each set to one or more attributes associated with the one or more corresponding content elements;
   generating a template for a native content item based at least in part on a selected content item included in the mapping, wherein the generated template includes the one or more attributes associated with the one or more corresponding content elements, wherein the native content item is generated in part by identifying one or more content data associated with one or more content elements included in the template and formatting the one or more content data using the template to generate the native content item;
   providing a rendering of one or both of the native display page and the template, including a template adjustment user interface configured to modify the one or more attributes associated with the one or more corresponding content elements included in the generated template;
   embedding code associated with the template into code associated with the native display page, wherein the code associated with the template includes code for the one or more attributes associated with the one or more corresponding content elements included in the generated template, wherein the code associated with the template includes code to remove, disable, deactivate, and/or alter advertising technologies on the native display page other than the native content item;
   receiving a request for the native display page, wherein the native display page includes the embedded code associated with the template;
   in response to receiving the request for the native display page, generating the native content item based on the template, wherein the generated native content item includes the one or more attributes associated with the one or more corresponding content elements; and
   providing the native content item for display in the native display page.

2. The method of claim 1, wherein the one or more hierarchically related sets of native hierarchical content elements are displayed based at least in part on the one or more attributes associated with the plurality of native hierarchical content elements of the native display page.

3. The method of claim 2, wherein the one or more attributes associated with the plurality of native hierarchical content elements of the native display page include one or more of a hierarchy associated with the native hierarchical content elements, a placement of the native hierarchical content elements on the native display page, one or more appearance characteristics associated with the native hierarchical content elements, and one or more types of native hierarchical content elements.

4. The method of claim 2, wherein the rendered native display page is provided in a rendering environment simulating the rendering of the native display page on one or more of a personal computer, a mobile device, a wearable computing device, and a smart television.

5. The method of claim 1, wherein providing a rendering of the native display page includes the native hierarchical content elements and one or more viewability indicators, wherein the one or more viewability indicators are associated with how often portions of the native display page are viewed.

6. The method of claim 1, wherein the mapping step comprises mapping each of at least the subset of the native hierarchical content elements in the selected content item to one or more corresponding content elements such that at least one attribute associated with the content elements matches at least one attribute associated with the subset.

7. The method of claim 1, wherein the template includes one or more of: at least one set of content elements, a placement of the at least one set of the content elements on the native display page, and one or more display attributes associated with the at least one set of content elements.

8. The method of claim 1, further comprising:
generating the native content item based at least in part on the template and the one or more content data; and
storing the native content item.

9. The method of claim 8, further comprising:
receiving a call for the native content item; and
providing, based at least in part on the call, the native content item.

10. The method of claim 9, further comprising:
measuring a level of interaction with the native content item on the native display page; and
determining an effectiveness of the native content item based at least in part on the level of interaction.

11. The method of claim 1, wherein the native hierarchical content elements include native content elements associated with a web-based publication.

12. The method of claim 1, further comprising:
mapping a second content item comprising a second set of native hierarchical content elements to one or more corresponding content elements, wherein the second set of native hierarchical content elements are associated with a second native display page that is associated with a native display page associated with the selected set; and
generating a second template based at least in part on the mapping of the second set of native hierarchical content elements to the corresponding content elements.

13. The method of claim 12, wherein the second native display page includes a full page associated with a selected set of native hierarchical content elements.

14. The method of claim 12, wherein the second native display page comprises a page associated with a section of a website that includes the native display page.

15. The method of claim 1, further comprising:
monitoring the native display page associated with the set of native hierarchical content elements for changes; and
detecting a change to at least one native hierarchical content element on the native display page.

16. The method of claim 15, further comprising:
based at least in part on the detected change, re-mapping each of at least the subset of the native hierarchical content elements in the set of native hierarchical content elements to one or more corresponding content elements; and
generating an updated template based at least in part on the re-mapping.

17. A system, comprising:
a processor; and
a memory coupled with the processor, wherein the memory is configured to provide the processor with instructions which when executed cause the processor to:
parse source code of a native display page to determine a plurality of native hierarchical content elements of the native display page and one or more attributes associated with the plurality of native hierarchical content elements of the native display page;
process the parsed source code to determine one or more hierarchically related sets of native hierarchical content elements comprising the native display page, each set comprising a content item comprising the native display page;
map each of at least a subset of the native hierarchical content elements in each of said sets of native hierarchical content elements to one or more corresponding content elements, wherein the mapping includes copying the one or more attributes associated with the native hierarchical content elements in each set to one or more attributes associated with the one or more corresponding content elements;
generate a template for a native content item based at least in part on a selected content item included in the mapping, wherein the generated template includes the one or more attributes associated with the one or more corresponding content elements, wherein the native content item is generated in part by identifying one or more content data associated with one or more content elements included in the template and formatting the one or more content data using the template to generate the native content item;
provide a rendering of one or both of the native display page and the template, including a template adjustment user interface configured to modify the one or more attributes associated with the one or more corresponding content elements included in the generated template;
embed code associated with the template into code associated with the native display page, wherein the code associated with the template includes code for the one or more attributes associated with the one or more corresponding content elements included in the generated template, wherein the code associated with the template includes code to remove, disable, deactivate, and/or alter advertising technologies on the native display page other than the native content item;

receive a request for the native display page, wherein the native display page includes the embedded code associated with the template;

in response to receiving the request for the native display page, generate the native content item based on the template, wherein the generated native content item includes the one or more attributes associated with the one or more corresponding content elements; and provide the native content item for display in the native display page.

18. The system of claim 17, wherein to provide a rendering of the native display page including the native hierarchical content elements are displayed based at least in part on the attributes associated with the native display page.

19. A computer program product for native content creation, the computer program product being embodied in a tangible non-transitory computer readable storage medium and comprising computer instructions for:

parsing source code of a native display page to determine a plurality of native hierarchical content elements of the native display page and one or more attributes associated with the plurality of native hierarchical content elements of the native display page;

processing the parsed source code to determine one or more hierarchically related sets of native hierarchical content elements comprising the native display page, each set comprising a content item comprising the native display page;

mapping each of at least a subset of the native hierarchical content elements in each of said sets of native hierarchical content elements to one or more corresponding content elements, wherein the mapping includes copying the one or more attributes associated with the native hierarchical content elements in each set to one or more attributes associated with the one or more corresponding content elements;

generating a template for a native content item based at least in part on a selected content item included in the mapping, wherein the generated template includes the one or more attributes associated with the one or more corresponding content elements, wherein the native content item is generated in part by identifying one or more content data associated with one or more content elements included in the template and formatting the one or more content data using the template to generate the native content item;

providing a rendering of one or both of the native display page and the template, including a template adjustment user interface configured to modify the one or more attributes associated with the one or more corresponding content elements included in the template;

embedding code associated with the template into code associated with the native display page, wherein the code associated with the template includes code for the one or more attributes associated with the one or more corresponding content elements included in the generated template, wherein the code associated with the template includes code to remove, disable, deactivate, and/or alter advertising technologies on the native display page other than the native content item;

receiving a request for the native display page, wherein the native display page includes the embedded code associated with the template;

in response to receiving the request for the native display page, generating the native content item based on the template, wherein the generated native content item includes the one or more attributes associated with the one or more corresponding content elements; and providing the native content item for display in the native display page.

20. The method of claim 1, wherein the code associated with the template interferes with advertising technology to prevent the advertising technology from functioning and interfering with the native content item.

21. The method of claim 1, wherein the code associated with the template includes code to remove code associated with advertising technology from the source code associated with the native display page.

\* \* \* \* \*